United States Patent
Schweitzer

(10) Patent No.: US 8,348,514 B2
(45) Date of Patent: Jan. 8, 2013

(54) BEARING ASSEMBLY

(75) Inventor: Ferdinand Schweitzer, St. Peter in der Au (AT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 13/189,622

(22) Filed: Jul. 25, 2011

(65) Prior Publication Data

US 2012/0027335 A1 Feb. 2, 2012

(30) Foreign Application Priority Data

Jul. 29, 2010 (DE) .......................... 10 2010 038 592

(51) Int. Cl.
*F16C 33/46* (2006.01)

(52) U.S. Cl. ..................... 384/579; 384/572; 384/578

(58) Field of Classification Search .................. 384/523, 384/574–575, 579, 593, 614, 618, 903, 572, 384/578

See application file for complete search history.

(56) References Cited

U.S. PATENT DOCUMENTS

| | | | | | |
|---|---|---|---|---|---|
| 2,013,123 | A | * | 9/1935 | Baker | 384/579 |
| 2,267,708 | A | * | 12/1941 | Cox | 384/574 |
| 3,471,208 | A | * | 10/1969 | Vannest | 384/530 |
| 4,118,259 | A | * | 10/1978 | Bingle et al. | 384/579 |
| 4,582,436 | A | * | 4/1986 | Merron | 384/593 |
| 4,902,145 | A | * | 2/1990 | Johnson | 384/530 |
| 5,205,657 | A | * | 4/1993 | Feld | 384/623 |
| 7,121,729 | B2 | * | 10/2006 | Davis et al. | 384/523 |
| 2006/0120652 | A1 | | 6/2006 | Docimo | |

FOREIGN PATENT DOCUMENTS

| | | |
|---|---|---|
| DE | 858912 B | 12/1952 |
| DE | 764314 C | 1/1953 |
| DE | 1017422 B | 10/1957 |
| DE | 4218609 A1 | 12/1993 |
| JP | 2001124091 A * | 5/2001 |
| JP | 2001271842 A * | 10/2001 |
| JP | 2002155952 A * | 5/2002 |
| JP | 2003083334 A * | 3/2003 |
| JP | 2003139142 A * | 5/2003 |
| JP | 2006226448 A * | 8/2006 |
| JP | 2007263279 A | 10/2007 |
| JP | 2009092162 A * | 4/2009 |

* cited by examiner

*Primary Examiner* — Marcus Charles
(74) *Attorney, Agent, or Firm* — Mark A. Ussai; Bryan Peckjian

(57) ABSTRACT

A roller bearing cage includes a first side ring, a second side ring and a plurality of axially-extending bridges connecting the side rings. A pocket for retaining a roller body is defined between the side rings and each two adjacent bridges. The two side rings and the bridges are integrally formed in one-piece. Reinforcement rings are disposed on one or both outer axial sides of the side rings. One or more connecting elements extend axially through the respective bridges, side rings and reinforcement rings. At least one axial end of the connecting element(s) directly or indirectly affixes the reinforcement ring(s) to the side ring(s).

20 Claims, 2 Drawing Sheets

BEARING ASSEMBLY

CROSS-REFERENCE

This application claims priority to German patent application no. 10 2010 038 592.1 filed on Jul. 29, 2010, the contents of which are incorporated by reference as if fully set forth herein.

TECHNICAL FIELD

The present invention generally relates to a roller bearing cage, which may be advantageously utilized, e.g., in a traction motor for locomotives.

BACKGROUND

Roller bearings are known that include a first side ring, a second side ring and a plurality of bridges extending in an axial direction so as to connect the side rings. A pocket for retaining a roller body is defined between each two adjacent bridges and the side rings. The two side rings and the bridges may be integrally formed, thereby providing a solid cage manufactured in one-piece.

In order to manufacture such a solid cage, the retaining pockets for the roller bodies may be milled or cut out of a ring-shaped blank using a milling cutter. The blank may be comprised of brass or bronze. Such cages advantageously provide a stable construction. In addition, it is also possible to manufacture such a solid cage from a plastic material using an injection molding process.

The applications for roller bearings having a solid cage are diverse. In particular, however, it is noted that such cages are often used in railroad engineering, such as in a traction motor for driving the locomotive. In such applications, a cylindrical roller bearing that includes the above-described cage is often utilized for rotatably supporting the pinion.

However, because the roller bearing cage may be subjected to relatively large loads in the traction motor, the cage sometimes breaks during operation of the locomotive. Breakage of the cage could cause a blockage or jamming of the roller bearing and thus blockage or stoppage of the traction motor.

For a locomotive in one-track train operation, such a breakage could cause a blockage of the railway track for several hours, in certain circumstances even several days. Therefore, in particular for bearings utilized in traction motors for locomotives, it is known to utilize riveted cages that are provided with so-called Huck bolt rivets. In such embodiments, instead of a one-piece cage, a cage comprised of a plurality of parts that are riveted together is used. More specifically, the side rings and the bridges are riveted together, rather than being integrally formed.

A cage breakage can be ascertained in the train driver's cabin based upon a change in operating performance, e.g., increased power consumption. When a cage breakage is determined, the driver can attempt to continue to drive to the next passing loop or to the next train station, so as to avoid blocking the track. Huck bolt riveting typically prevents a cage breakage from causing a blockage of the roller bearing that could disable the locomotive and require repair on the spot.

However, such cages riveted with Huck bolts exhibit a lower structural strength than a one-piece cage. As a result, such cages are less resistant to mechanical loading and thus are more susceptible to breakage under heavy loads, even though such cages have good fail-safe properties.

SUMMARY

It is an object of the present teachings to provide an improved roller bearing cage.

In one aspect of the present teachings, the roller bearing cage may exhibit relatively high mechanical stability while still reducing the likelihood of a blockage of the roller bearing in the event of a cage breakage. That is, this aspect of the present teachings provides a high-strength cage with excellent fail-safe properties and a long service life.

In particularly preferred embodiments, such cages can prevent or substantially reduce the likelihood of a blockage or stoppage of the traction motor of a locomotive in the event of a cage breakage.

In another aspect of the present teachings, the cage preferably comprises at least one connecting element that penetrates or extends through at least one part of the bridge in the axial direction. In addition or in the alternative, one or both of the axial ends of the connecting element(s) may directly or indirectly abut the side ring(s) of the cage, e.g., via one or two intervening reinforcement rings, as will be discussed below. The connecting element(s) thus serve(s) to reinforce the bridge(s) in the event that the bridge(s) were to crack or break during operation, thereby maintaining the overall structural integrity of the roller bearing cage. Furthermore, the connecting element(s) may retain the components of the roller bearing cage in the axial direction (i.e. if the axial end(s) of the connecting element(s) abut(s) or contact(s) one or both outer axial end faces of the roller bearing cage), thereby further maintaining structural integrity in the event that one or more parts of the roller bearing cage break during operation. Thus, the connecting elements may prevent the cage from splitting apart, even if parts thereof break, and also possibly prevent broken parts from flying off and jamming up the rotation of the roller bearing or other components that are borne by the roller bearing, e.g., a pinion of a fraction motor.

More preferably, every bridge is reinforced by a connecting element that extends through a hole in the bridge.

In addition or in the alternative, the axial end(s) of the connecting element(s) may directly or indirectly abut or be connected with the side ring(s) and/or the reinforcement ring(s) in an interference fit manner.

In addition or in the alternative, the roller bearing cage may preferably be utilized in a cylindrical roller bearing, in which case the pockets of the roller bearing cage are shaped so as to receive and retain cylindrical rollers.

In addition or in the alternative, the connecting element(s) may be formed as a rivet, such as a round head rivet.

In addition or in the alternative, the connecting element(s) may be formed as a lock bolt or retaining ring bolt (rivet). For example, in embodiments constructed with one or more lock bolts, the closing or shop head may be formed by pressing a metallic ring into an annular groove of the associated bolt body while undergoing plastic deformation. At the same time, the components are tightened up (squeezed) by the installation tool. After reaching the desired preload force, the overhanging or protruding (excess) part of the lock bolt is broken off. The strength of such a rivet connection is comparable with high-strength screw connections.

The roller bearing cage is preferably formed as a solid cage made of brass, steel or bronze.

In another aspect of the present teachings, the cage preferably includes at least one reinforcement ring disposed on an axial end side or face of one or both of the side rings. The connecting element(s) preferably penetrate(s) or extend(s) through the reinforcement ring(s) and affix(es) the reinforcement ring(s) to the (respective) side ring(s).

In such an embodiment, the reinforcement ring preferably has the same radial dimensions or measurements as the side ring, on which it is disposed. The reinforcement ring is also preferably formed from brass, steel or bronze.

Roller bearing cages according to the present teachings preferably exhibit a reduced likelihood of blockage or jamming of the roller bearing in the event of a cage breakage. In addition or in the alternative, a relatively high cage strength is provided so that the cage can better withstand mechanical loading during operation.

In preferred embodiments of the roller bearing cage utilized in a traction motor, a reduced danger of cage breakage along the driving route of the locomotive is provided and/or the service life of the bearing is preferably increased, i.e. the bearing can remain in service longer when the inventive cage is utilized.

Roller bearing cages according to certain aspects of the present teachings combine the advantages of a one-piece cage design with Huck (lock) bolt riveting.

When a cage breaks in a traction motor in a locomotive, the power consumption of the traction motor increases. The train engineer (driver) can ascertain the increased power consumption based upon instrumentation in the train driver's cabin and determine that a fault exists. The train engineer can then stop the locomotive in the next train station in order to investigate the cause of the fault, since the present cages preferably reduce the likelihood of a blockage or jamming of the roller bearing along the driving route that would require repair on the spot.

The riveted-on side rings impart significantly more strength overall to the cage so that the danger of a blockage is reduced in the event of a cage breakage.

Further objects, embodiments, advantages and designs will be explained in the following with the assistance of the exemplary embodiments and the appended Figures.

DETAILED DESCRIPTION OF THE INVENTION

Figure 1:
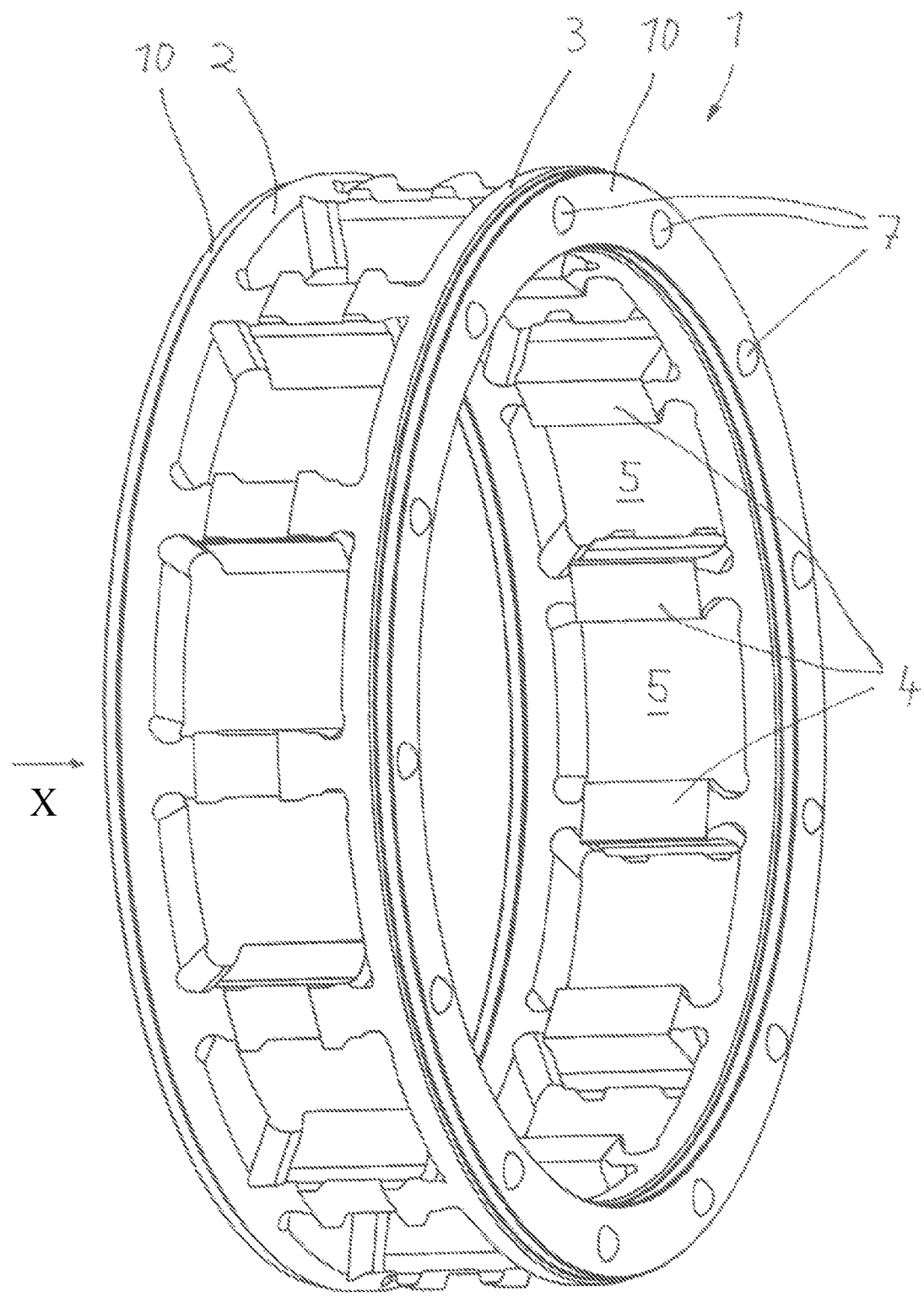
FIG. 1 shows a roller bearing cage of a representative cylindrical roller bearing in a perspective illustration.
Figure 2:
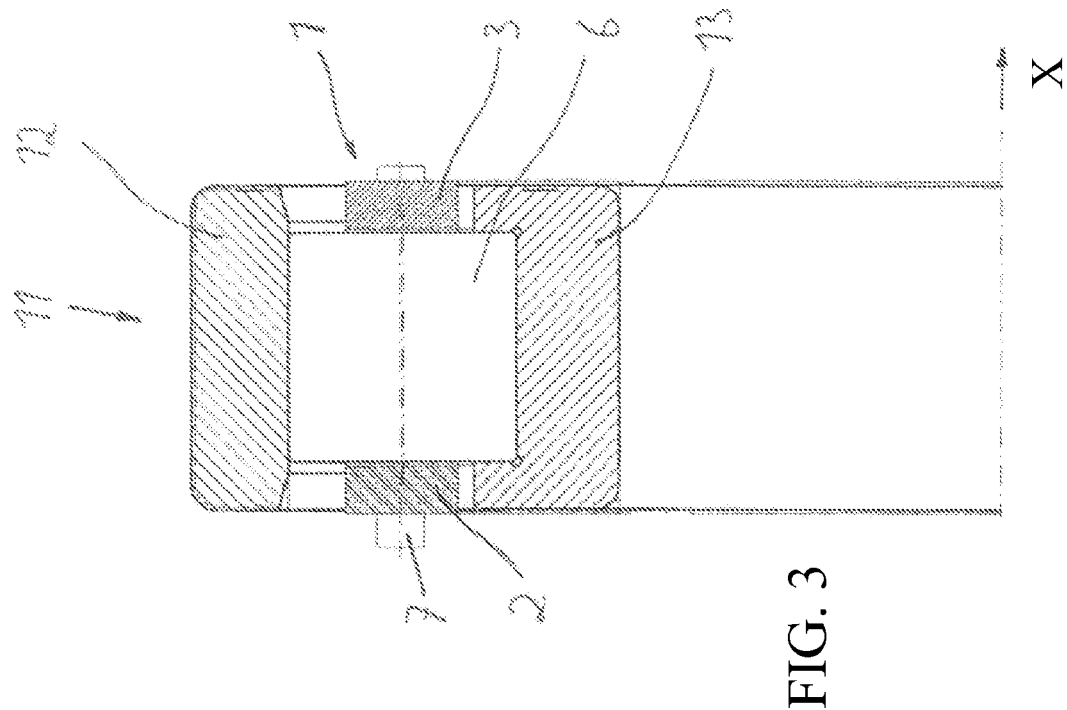
FIG. 2 shows an axial cross-section through the cage of FIG. 1 along with a perspective view of the cage in the radial direction.

A first roller bearing cage 1 according to the present teachings is illustrated in FIGS. 1 and 2 and is formed as a solid cage. A first side ring 2 is connected to a second side ring 3 by a plurality of bridges 4.

A retaining pocket 5 for a roller body (see e.g., cylindrical roller 6 of FIG. 3) is defined between the two side rings 2, 3 and each two adjacent bridges 4 in the circumferential direction.

The cage 1 may be manufactured from a ring-shaped blank by milling or cutting. In this case, the retaining pockets for the roller bodies are machined into the hollow cylindrical base body of the cage using a milling cutter.

As can be seen by viewing FIGS. 1 and 2 together, a connecting element 7 in the form of a rivet extends through (penetrates) each bridge 4 in the axial direction X. That is, one rivet 7 extends through each bridge 4. However, it is within the scope of the present teachings that two or more rivets or other connecting elements may extend through one or more of the bridges and/or one or more bridges may not have any rivet or connecting element extending therethrough. For example, one or more rivets or connecting elements may extend through every other bridge in the circumferential direction of the cage 1.

A reinforcement ring 10 is disposed on each of the two axial end sides of the roller bearing cage 1, although only one is necessary according to the present teachings. The rivets 7 also extend through each reinforcement ring 10 in the same manner as described above. Each axial end 8, 9 of the rivet 7 has a rivet head that binds and retains the reinforcement ring 10 on the side rings 2, 3 in an interference fit manner. One axial end (e.g., axial end 8) is preferably a factory head (i.e. it is made at the rivet manufacturing factory) and the other axial end (e.g., axial end 9) is preferably a shop head (i.e. it is formed at the time of assembling the cage 1 with the reinforcement ring(s) 10).

Thus, even if a portion of the cage 1 breaks, such as one or more of the bridges 4, a relatively stable connection still results, so that the cage 1 will continue to retain its structural integrity. In addition, the connecting element(s) 7 may prevent broken parts of the cage from coming loose and/or being ejected from the cage 1, which might cause a blockage or jamming of the roller bearing and/or an associated traction motor. As a result, the danger of a blockage or jamming of the bearing is reduced.

Figure 3:
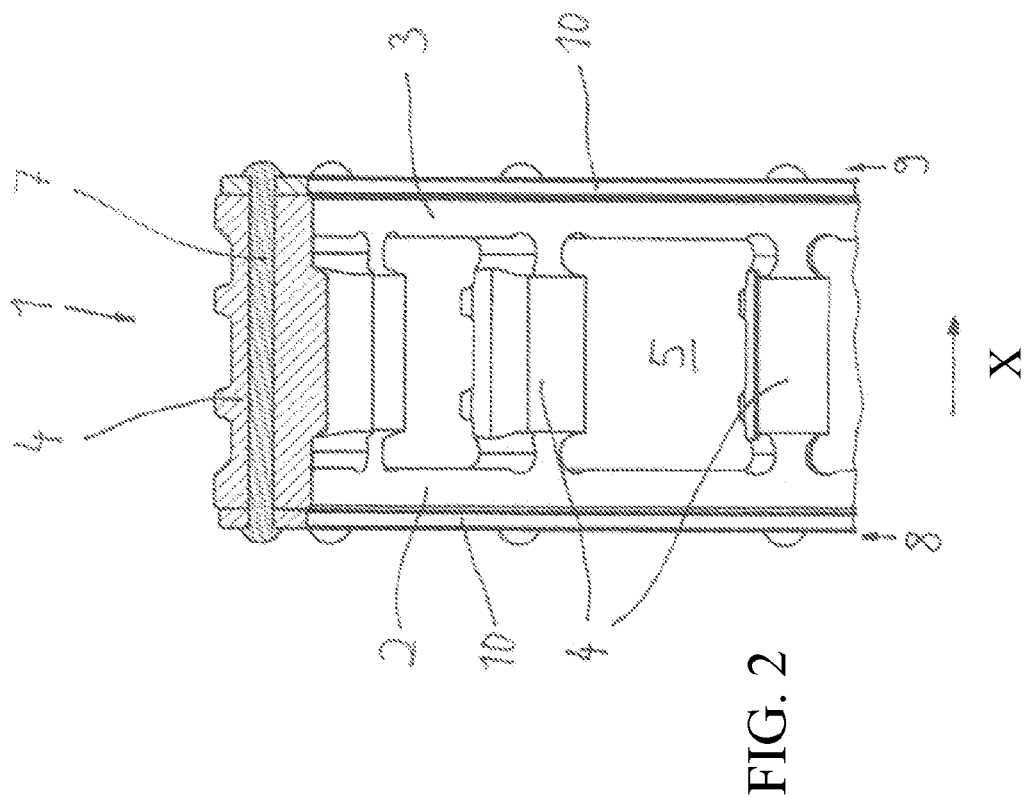
FIG. 3 shows an axial cross-section through a cylindrical roller bearing having an alternatively-embodied cage.

In FIG. 3, a cylindrical roller bearing 11 can be seen in radial cross-section, in which a plurality of cylindrical rollers 6 are disposed between the outer ring 12 and an inner ring 13.

In contrast to the exemplary embodiment shown in FIGS. 1 and 2, the cage 1 of FIG. 3 is not laterally bound by reinforcement rings, i.e. this embodiment does not include reinforcement rings. Instead, while the connecting elements 7 in the form of rivets also penetrate through and reinforce the bridges 4 of the cage 1, the axial ends of the connecting elements 7 abut directly on the side rings 2, 3 of the cage 1 in an interference fit manner.

The advantages of the present teachings can be provided in cages made of a variety of materials, e.g., polymer, brass, bronze or steel. Furthermore, the present teachings are not limited to cages for cylindrical bearings. Even in other types or geometries of roller bearings, damage can be prevented by the reinforcement means (e.g., the connecting element(s) and optionally also the reinforcement ring(s)) to reduce the possibility of complications in case a portion of the cage breaks during operation, e.g., to improve the fail-safe properties of the cage. Thus, cages according to the present teachings may also be advantageously utilized in angular contact roller bearings, tapered roller bearings, ball bearings, etc.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved roller bearing cages and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST 1 roller bearing cage
2 first side ring
3 second side ring
4 bridge
5 retaining pocket
6 roller body (cylindrical roller)
7 connecting element
8 axial end
9 axial end
10 reinforcement ring
11 cylindrical roller bearing
12 outer ring
13 inner ring
X axial direction

The invention claimed is:

1. A roller bearing cage comprising:
a first side ring,
a second side ring,
a plurality of axially-extending bridges having first and second axial ends that respectively adjoin the first and second side rings, wherein a pocket configured to retain a roller body is defined between the side rings and each two adjacent bridges in a circumferential direction, wherein the two side rings and the plurality of bridges are integrally formed of the same material without gaps or internal breaks,
at least one reinforcement ring disposed on an axial side of at least one of the first and second side rings that is opposite of the bridges, and
at least one connecting element extending axially through at least one bridge, at least one side ring and the at least one reinforcement ring, wherein at least one axial end of the connecting element abuts directly or indirectly on the at least one reinforcement ring and connects the at least one reinforcement ring to the adjacent side ring.

2. A roller bearing cage according to claim 1, further comprising a plurality of connecting elements respectively extending through the plurality of bridges.

3. A roller bearing cage according to claim 2, wherein axial ends of the connecting elements are directly or indirectly connected with the side rings in an interference fit manner.

4. A roller bearing cage according to claim 3, wherein the pockets are configured to retain cylindrical rollers.

5. A roller bearing cage according to claim 2, wherein the connecting elements are formed as rivets.

6. A roller bearing cage according to claim 2, wherein the connecting elements are formed as round head rivets.

7. A roller bearing cage according to claim 2, wherein the connecting elements are formed as lock bolts.

8. A roller bearing cage according to claim 2, wherein the side rings and the plurality of bridges are integrally formed from one of brass, steel and bronze.

9. A roller bearing cage according to claim 8, wherein a reinforcement ring is disposed on each outer axial end side of the first and second side rings and the connecting elements extend through both reinforcement rings so as to affix the reinforcement rings to the respective side rings.

10. A roller bearing cage according to claim 9, wherein the reinforcement rings have the same radial dimensions as the side rings.

11. A roller bearing cage according to claim 10, wherein the reinforcement rings are each comprised of one of brass, steel and bronze.

12. A roller bearing cage according to claim 11, wherein the connecting elements are each comprised of one of brass, steel and bronze and are formed as one of rivets and lock bolts.

13. A roller bearing cage according to claim 1, wherein the connecting element comprises a rivet.

14. A roller bearing cage according to claim 1, wherein the at least one reinforcement ring has the same radial dimensions as the side rings.

15. A roller bearing cage comprising:
a first side ring,
a second side ring,
a plurality of axially-extending bridges connecting the first side ring to the second side ring, wherein a plurality of pockets configured to retain respective roller bodies are defined between the side rings and circumferentially-adjacent bridges, and wherein the side rings and the plurality of bridges are integrally formed from a single material without gaps or internal breaks,
a first reinforcement ring disposed on a first outer axial side of the first side ring,
a second reinforcement ring disposed on a second outer axial side of the second side ring, and
at least one connecting element extending axially through each bridge, the first and second side rings and the first and second reinforcement rings, wherein outer axial ends of the connecting elements abut, directly or indirectly, on the respective reinforcement rings and affix the reinforcement rings to the respective side rings in an interference fit.

16. A roller bearing cage according to claim 15, wherein the pockets are configured to retain cylindrical rollers.

17. A roller bearing cage according to claim 15, wherein the connecting elements comprise one of rivets and lock bolts.

18. A roller bearing cage according to claim 15, wherein the side rings, bridges, connecting elements and reinforcement rings are formed from one of brass, steel and bronze.

19. A roller bearing cage according to claim 15, wherein the reinforcement rings have the same radial dimensions as the side rings.

20. A roller bearing cage according to claim 19, wherein:
the connecting elements comprise one of rivets and lock bolts and
the side rings, bridges, connecting elements and reinforcement rings are formed from one of brass, steel and bronze.

* * * * *